Jan. 16, 1962 P. J. LIAUTAUD 3,016,797
EYE PROTECTIVE SPECTACLE TYPE GOGGLE
Filed Jan. 20, 1959
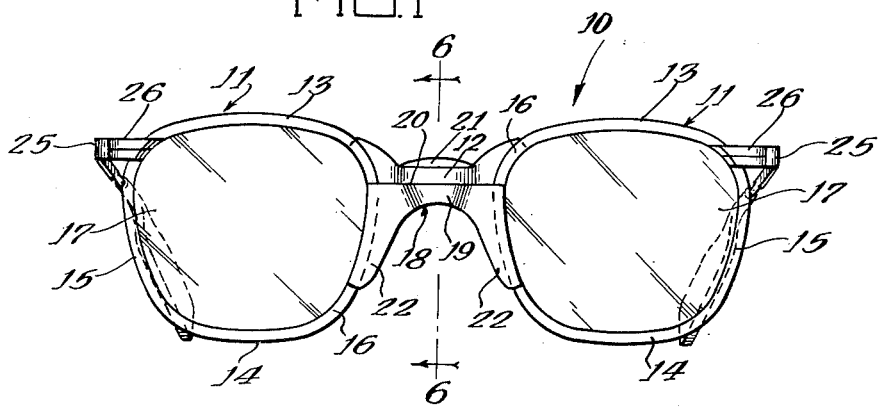
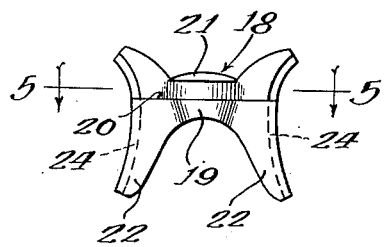
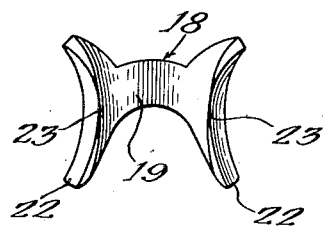
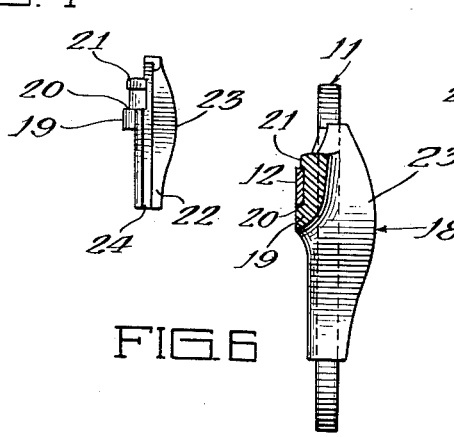
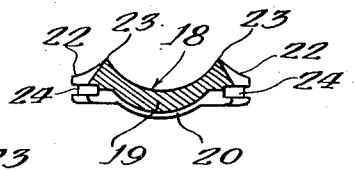
Inventor:
Philip J. Liautaud
By: Wallace and Cannon
Attorneys 3,016,797
EYE PROTECTIVE SPECTACLE TYPE GOGGLE
Philip J. Liautaud, Chicago, Ill., assignor to Fendall Company, Chicago, Ill., a corporation of Illinois
Filed Jan. 20, 1959, Ser. No. 787,898
4 Claims. (Cl. 88—43)

This invention relates to eye protective goggles or glasses of the spectacle type, and nose pads and bridge members therefor, and more particularly to such a device which is adapted to be worn by workmen and other employees in factories, and like places, to protect the eyes of the wearer from injury due to flying particles.

Eye protective goggles of the spectacle type in present day use employ various types of nose pads but the most commonly used type employs nose pads which are attached to the lens frames by means of metal arms of goose-neck shape. These nose pad supporting arms are usually made of ductile metal so that they can be shaped and formed to align the nose pads for proper positioning along the sides of the wearer's nose.

In industrial plants, goggles of this type receive extremely hard usage, being commonly carried, when not in use, in the wearer's pocket or in tool boxes. Due to such rough handling, the nose pad supporting arms are easily bent or deformed out of their original position and alignment to such an extent that the nose pads will not fit the nose of the wearer. Moreover, in such cases, the nose pads tend to dig into the sides of the wearer's nose causing discomfort to the wearer. To overcome such difficulties it is necessary to have trained personnel to readjust the nose pads and their supporting arms so that they will again fit the wearer comfortably.

However, repeated adjustments of the nose pads and their supporting arms embrittles the metal in the nose pad supporting arms to a point where the nose pad supporting arms are apt to break. Moreover, since the nose pad supporting arms are usually welded or hand-soldered directly to the lens frames, there is no way in which they can be easily replaced and in such cases the entire frame has to be discarded.

Another disadvantage of the prior art eye protective goggles is that, in order to accommodate them to wearers having varying nose widths such prior goggles are customarily made in five different bridge widths, ranging in sizes from 18 mm. to 26 mm., there being a 2 mm. variation in each size. To properly fit all of its workmen it becomes necessary, therefore, for an industrial plant to carry a very substantial inventory comprising all five nose bridge sizes. Moreover, should a plant find itself temporarily out of a particular size, it will issue to the workmen the closest size available in stock, regardless of the fact that the size issued does not properly fit the workman to whom it is issued.

Another reason why prior art goggles of the type described are unsatisfactory is that the design of the bridge and nose pads does not lend itself to the shape of noses of the Negroid type. I have found that conventional nose pads are set too deep and too low to accommodate the extremely shallow depth and broad flare of noses of this type.

Accordingly, an object of the present invention is to provide a new and improved spectacle type goggle embodying a primary nose bridge member interconnecting the lens frames, and a novel auxiliary combination nose bridge and nose pad member which is removably attachable to the primary nose bridge member.

Another object of the present invention is to provide a novel means of attaching the auxiliary combination nose bridge and nose pad member to the primary nose bridge member without the use of screws or other similar fastening means.

Another object of the present invention is to provide a novel means for latching the auxiliary combination nose bridge and nose pad member to the primary nose bridge member in such a manner that it cannot be accidentally removed or dislodged from its position while at the same time permitting it to be readily removed without the use of tools of any kind.

Another object of the present invention is to provide a novel means for effecting the ready interchangeability of the new auxiliary combination nose bridge and nose pad members of various sizes or shapes to fit the configuration of the nose of each individual wearer.

Other and further objects of the present invention will be apparent from the following description and claims and are illustrated in the accompanying drawing, which by way of illustration, shows a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

In the drawings:

FIG. 1 is a front elevational view of an eye protective spectacle type goggle embodying the present invention;

FIG. 2 is a front elevational view of the new auxiliary combination nose bridge and nose pad member;

FIG. 3 is a rear elevational view of the new auxiliary combination nose bridge member and nose pad member shown in FIG. 2;

FIG. 4 is an end elevational view of the new auxiliary nose bridge member and nose pad member as seen from the right hand side in FIG. 2;

FIG. 5 is a sectional top plan view on line 5—5 in FIG. 2; and

FIG. 6 is an enlarged transverse vertical sectional view on line 6—6 in FIG. 1.

A preferred and typical embodiment of the new spectacle type goggle embodying the present invention is illustrated in the drawing and comprises a frame front 10 which may be made of any suitable material. Thus, for example, the frame front 10 may be molded or fabricated of synthetic resinous plastic material which may be, for example, cellulose acetate butyrate, or it may be die cast or formed of any suitable metal such, for example, as an aluminum alloy or nickel silver. The frame front 10 includes a pair of lens frames 11 and a primary nose bridge member 12 which extends between and is integrally joined to the lens frames 11 (FIGS. 1, 5 and 6).

Each of the lens frames 11 includes a top wall 13, a bottom wall 14, an outer vertically extending wall 15, and an inner vertically extending wall 16, and a lens 17 is suitably mounted in each lens frame 11.

The new eye protective spectacle type goggle of the present invention provides and embodies a novel bridge and nose pad construction and to this end there is provided in the present invention an auxiliary combination nose bridge member and nose pad member 18 which includes a transversely extending nose bridge portion 19 which has a transverse latching groove 20 formed therein on its front face adjacent the upper portion thereof. This member 18 also has a latching portion 21 formed therein above the transverse latching groove 20; the latching portion 21 forming the upper wall of the latching groove 20 (FIG. 6).

The new auxiliary combination nose bridge and nose pad member 18 may be made of any suitable material. Thus, for example, it may be molded as a single unitary piece or body of material from a suitable synthetic plastic resinous material, such as cellulose acetate butyrate, or the like.

The new auxiliary combination nose bridge and nose pad member 18 includes a pair of outwardly flared and arcuately curved side wall portions 22, which are interconnected by the nose bridge member 19, and which are so designed and shaped as to correspond to the curvature of the inner vertically extending walls 16 of the lens frame 11, to which they are detachably attached in a novel manner and by novel means which will be described presently. Each of the outer side wall portions 22 of the auxiliary combination nose bridge and nose pad member 18 includes a nose pad portion 23. Each of the nose pad portions 23 has a relatively wide base at its inner end and tapers rearwardly to a relatively narrow ridge portion which extends a substantial distance rearwardly and is disposed substantially at the mid-point, that is, at the vertical center line of the vertical wall of the corresponding nose pad portion 22. Each of the nose pads 23 is arched rearwardly from a point above the nose bridge portion 19 of the member 18 to a point substantially therebelow and each nose pad 23 merges into the top and bottom surfaces of the corresponding side wall 22 of the member 18.

Each of the side walls 22 of the member 18 has an inwardly extending latching groove 24 formed therein on its outer surface and each of these latching grooves 24 is adapted to receive a portion of the inner wall 16 of the corresponding one of the lens frames 11 (FIGS. 2, 4 and 5).

As shown in the drawing, the nose pad portions 23 of the auxiliary combination nose bridge and nose pad member 18 when in use extends above and below the primary bridge member 12, for a reason which will be pointed out hereinafter.

The new eye protective spectacle type goggle includes a pair of temples 25 which may be of the skull or spatula type, or of the cable type, and each of the temples 25 is hingedly mounted as at 26, on one of the lens frames 11 in any suitable manner.

In the use of the new eye protective spectacle type goggle, the auxiliary combination nose bridge and nose pad member 18 may be detachably attached to the primary nose bridge member 12 without the use of or the need for screws or other like fastening elements. This is accomplished by sliding the side wall portions 22 of the new combination auxiliary nose bridge and nose pad member 18 along the inner vertically extending walls 16 of the lens frames 11, from a point disposed at the front and slightly below the inner vertically extending side walls 16 of the lens frames 11, so that a portion of the ininer vertically extending side walls 16 of each of the lens frames 11 will slidably enter and be received in the latching groove 24 in the corresponding one of the side walls 22 of the auxiliary combination nose bridge and nose pad member 18 as the latter is manually slid upwardly toward the primary nose bridge member 12. During this operation the latching portion 21, which forms the top wall of the transverse latching groove 20 in the auxiliary nose bridge and nose pad member 18, will slide under the primary nose bridge member 12, when its limit of travel has been reached, and will latchingly engage over the top edge of the primary nose bridge member 12 so as to latch the auxiliary combination nose bridge and nose pad member 18 in position of use on the spectacle frame front 10. During this operation the nose bridge portion 19 of the auxiliary combination nose bridge and nose pad member 18 will yield slightly, under the force of its own innate resiliency, to enable the nose bridge portion 19 thereof to pass under the primary nose bridge member 12, and the primary bridge member 12 will latchingly engage in the transverse latching groove 20 of the auxiliary nose bridge and nose pad member 18, as shown in FIG. 6.

In order to remove the auxiliary combination nose bridge and nose pad member 18 from position of use on the frame front 10 it is merely necessary to exert a slight rearward manual pressure on the latching portion 21 of the member 18 and then slide the auxiliary combination nose bridge and nose pad member 18 downwardly below the primary bridge member 12, thereby causing the grooved portions 24 of the side walls 22 of the member 20 to become disengaged from latching engagement with the inner vertically extending side walls 16 of the lens frames 12, thereby removing the auxiliary nose bridge and nose pad member 18 from the frame front 10.

It will be noted that the nose bridge pads 23, which are embodied in the auxiliary combination nose bridge and nose pad member 18, are disposed substantially in alignment with the primary nose bridge member 12 but extend both above and below the primary bridge member 12. Hence, the nose bridge pads 23, which are embodied in the auxiliary combination nose bridge and nose pad member 18, are so positioned relative to the primary nose bridge member 12 that they cooperate therewith to support the new goggle in proper vertical wearing position upon the nose of and before the eyes of the wearer.

While the upwardly extending portions of the nose bridge pads 23 which extend above the primary nose bridge member 12 are not essential in the practice of the present invention and can be omitted if desired; they are desirable since when used they impart stability to the new eye protective goggle when worn and prevent wobbling or up and down or criss-cross movement of the goggle on the face of the wearer, which might otherwise occur.

It will thus be noted that the present invention provides a new and improved eye protective spectacle type goggle which embodies a primary bridge member and an auxiliary combination nose bridge and nose pad member and novel means for readily manually detachably attaching the auxiliary combination nose bridge and nose pad member to the primary bridge member without the need for or use of screws or other separate fastening elements, and in such a manner that when the auxiliary combination nose bridge and nose pad member is in position of use upon the primary nose bridge member portions of the nose pads embodied therein extend above and below the primary bridge member for the reasons hereinbefore pointed out.

It will thus be seen from the foregoing description, considered in conjunction with the accompanying drawings, that the present invention provides a new and improved eye protective spectacle type goggle having the desirable advantages and characteristics, and accomplishing its intended objects, including those hereinbefore set forth and others which are inherent in the invention.

I claim:

1. A spectacle type goggle comprising a frame front including lens frames and a primary bridge member extending between and interconnecting said lens frames, an auxiliary combination nose bridge and nose pad member having nose pads set in a predetermined and spaced-apart permanently fixed position, said auxiliary combination nose bridge and nose pad member being detachably latchable to said primary bridge member, latching means formed in one of said bridge members and cooperating with the other of said bridge members for detachably latching said auxiliary combination nose bridge and nose pad member upon the said primary nose bridge member, the said auxiliary combination nose bridge and nose pad member including a nose bridge portion having a transversely extending latching groove formed therein for the slidable detachable reception of said primary nose bridge member, the said auxiliary combination nose bridge and nose pad member having a latching portion formed therein above the said transversely extending latching groove, and the said transversely extending latching groove being adapted to latchingly engage the upper horizontal edge portion of said primary nose bridge member.

2. A spectacle type goggle comprising a frame front including lens frames and a primary bridge member extending between and interconnecting said lens frames, an auxiliary combination nose bridge and nose pad member having nose pads set in a predetermined and spaced-apart permanently fixed position, said auxiliary combination nose bridge and nose pad member being detachably latchable to said primary bridge member, latching means formed in one of said bridge members and cooperating with the other of said bridge members for detachably latching said auxiliary combination nose bridge and nose pad member upon the said primary nose bridge member, the said auxiliary combination nose bridge and nose pad member including a pair of arcuately curved side wall portions each having a groove formed therein in its outer surface, each of said grooves being adapted to receive a portion of the inner vertically extending side wall of one of said lens frames, and the said auxiliary combination nose bridge and nose pad member including a nose bridge portion having a transversely extending latching groove formed therein for the slidable detachable reception of said primary nose bridge member, the said nose bridge portion of said auxiliary combination nose bridge and nose pad member having a latching portion formed therein above and forming the top wall of the said transversely latching portion of said auxiliary combination nose bridge, and the said nose pad member being adapted to latchingly engage the upper horizontal edge portion of said primary nose bridge member.

3. A spectacle type goggle comprising a frame front including lens frames and a primary bridge member extending between and interconnecting said lens frames, a removable auxiliary combination nose bridge and nose pad member having nose pads formed on the rear surface thereof, at least one of said members being slightly resilient, one of said members including a bridge portion having a portion projecting therefrom, the other of said members including a bridge portion having a coacting recessed portion therein, said removable auxiliary bridge member being manually slidably movable into and out of assembled relationship with the said primary bridge member from below the latter and when so moved slightly deflecting the said resilient one of said members against the force of its own innate resiliency to allow the said projecting portion of the said one of said members to extend into the said coacting recessed portion of the said other one of said members, the said projecting portion of said one of said members coacting with the said recessed portion of the said other one of said members to detachably but positively latch the said removable auxiliary bridge member to the said primary bridge member.

4. A spectacle type goggle comprising a frame front including lens frames and a primary bridge member extending between and interconnecting said lens frames, a removable auxiliary combination nose bridge and nose pad member having nose pads formed on the rear surface thereof, at least one of said members being slightly resilient, one of said members including a bridge portion having a portion projecting therefrom, the other of said members including a bridge portion having a coacting recessed portion therein, said auxiliary bridge member being manually slidably movable into and out of assembled relationship with the said primary bridge member from below the latter and when so moved slightly deflecting the said resilient one of said members against the force of its own innate resiliency to allow the said projecting portion of the said one of said members to extend into the said coacting recessed portion of the said other one of said members, the said projecting portion of said one of said members coacting with the said recessed portion of the said other one of said members to detachably but positively latch the said auxiliary bridge member to the said primary bridge member, the said auxiliary bridge member including a pair of arcuately curved side wall portions extending below the said projecting portion of the said one of said members and below the said recessed portion of the said other one of said members, and each of said side wall portions of said auxiliary bridge member being removably engageable with a portion of one of said lens frames.

References Cited in the file of this patent

UNITED STATES PATENTS

| | | |
|---|---|---|
| 600,496 | Meyrowitz | Mar. 8, 1898 |
| 1,001,734 | Day | Aug. 29, 1911 |
| 2,561,403 | Nelson | July 24, 1951 |
| 2,612,076 | Dietz | Sept. 30, 1952 |
| 2,682,196 | Baldanza et al. | June 29, 1954 |
| 2,774,279 | Olson et al. | Dec. 18, 1956 |
| 2,801,569 | Ralph | Aug. 6, 1957 |
| 2,844,995 | Belgard | July 29, 1958 |